May 8, 1956 J. P. GOULD 2,744,310
APPARATUS FOR HANDLING A FITTING UNDER PRESSURE
Filed Sept. 17, 1950 2 Sheets-Sheet 1
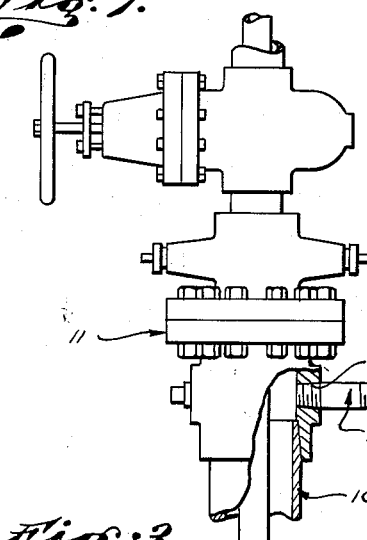
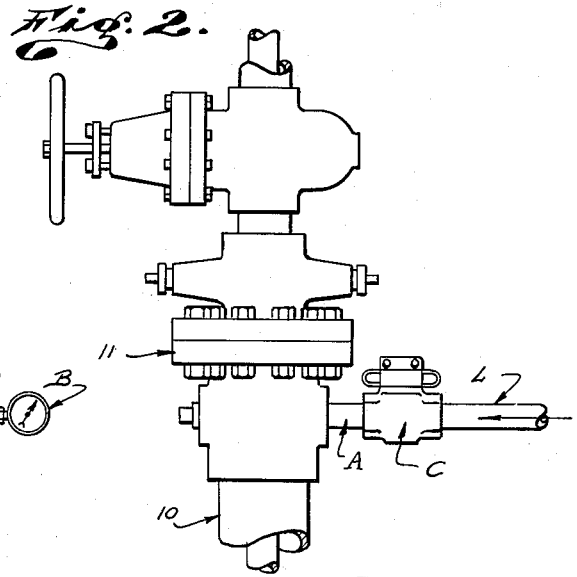
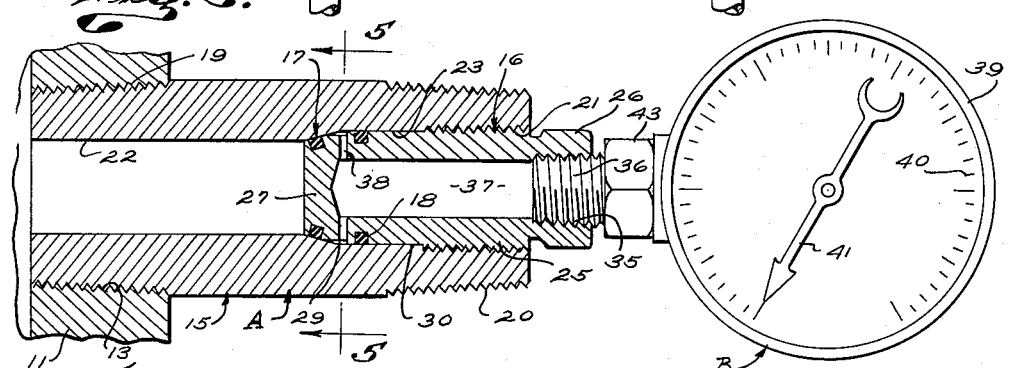
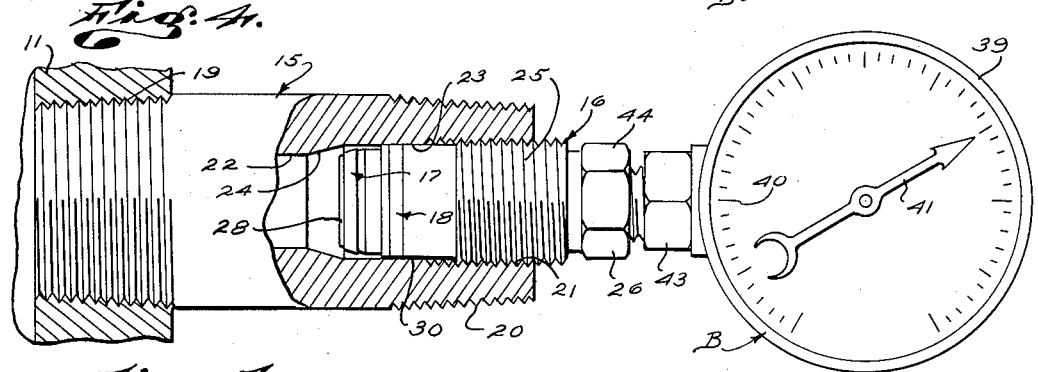
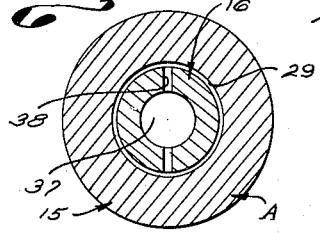
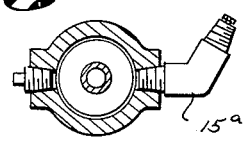
INVENTOR.
Jay P. Gould
BY
Attorney May 8, 1956  J. P. GOULD  2,744,310
APPARATUS FOR HANDLING A FITTING UNDER PRESSURE
Filed Sept. 17, 1950  2 Sheets-Sheet 2
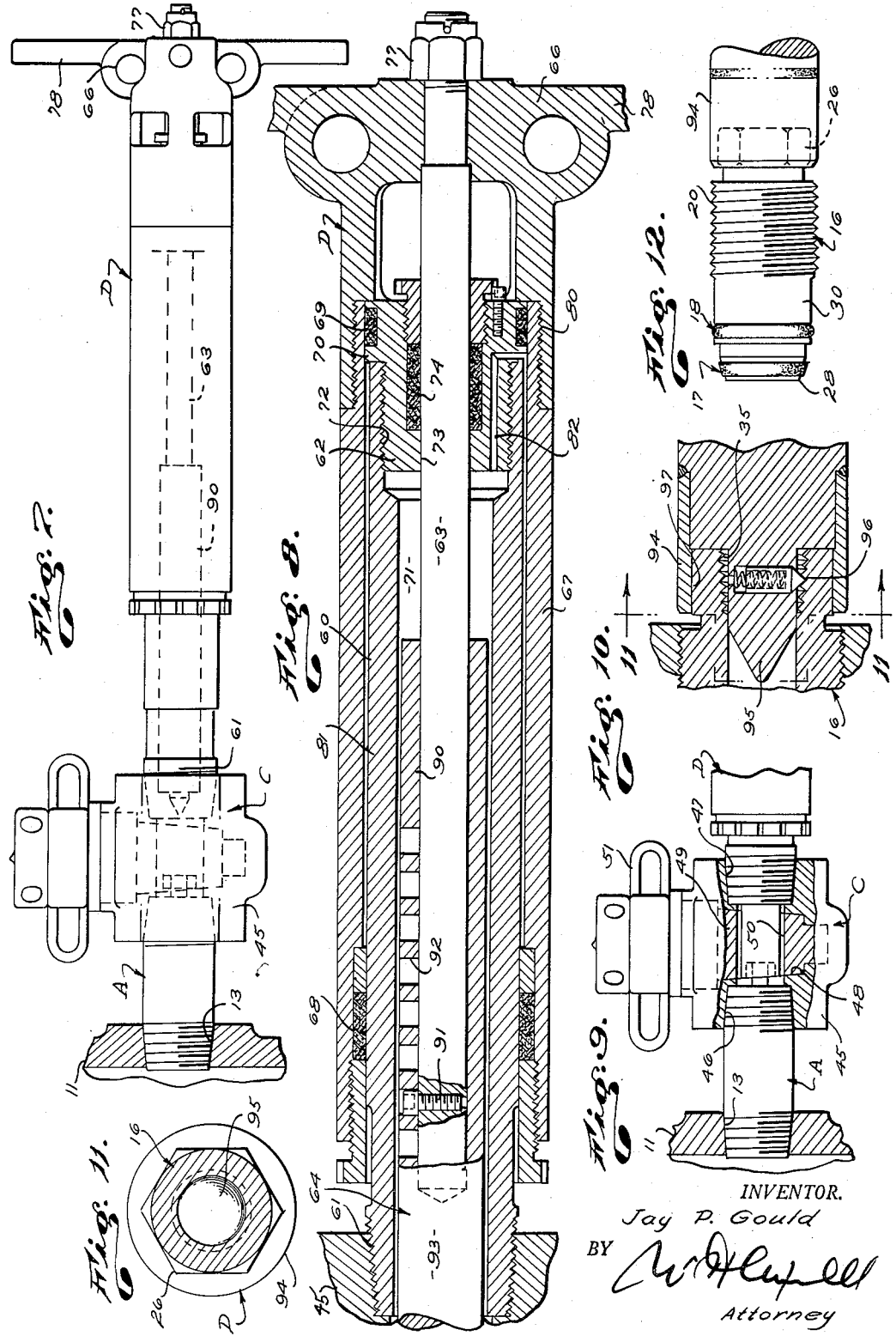
INVENTOR.
Jay P. Gould
BY
Attorney

United States Patent Office 2,744,310
Patented May 8, 1956

2,744,310

APPARATUS FOR HANDLING A FITTING UNDER PRESSURE

Jay P. Gould, La Canada, Calif.

Application September 17, 1951, Serial No. 247,005

4 Claims. (Cl. 29—213)

This invention has to do with apparatus for handling a fitting under pressure and it is a general object of the invention to provide a device for effecting simple, safe, rapid handling of a fitting or the like under pressure to effect various results, as for example, gauging, flow control, etc.

There are various situations where fluid under pressure is to be handled, as, for instance, selectively gauged or flowed. A typical situation arises in connection with an oil well where a casing is closed by a head and where, normally, the pressure in the casing and on the head is well pressure and rather high, for instance in the order of 500 to 10,000 pounds per square inch, and requires occasional measuring or gauging, and under certain circumstances or as conditions vary it may be desired to apply pressure to the casing, as, for instance, through the head, in excess of well pressure, to effect an operation such as is commonly referred to as "killing" the well. With methods and apparatus heretofore commonly employed the usual well head is equipped with an outlet duct or lateral fitting, and on such fitting there is permanently installed a high pressure valve controlling flow between the fitting and a bull plug, or the like, on which a gauge is installed. Such hook-up is suitable for gauging or determining the pressure on the head. When pressure is to be applied to the well or casing through the head the aforementioned valve is closed, the bull plug removed, and a fluid handling line applied to the valve, thus making it possible to thereafter open the valve and apply high pressure to the well through the line. The method and equipment just referred to is in most cases satisfactory. However, it is often cumbersome to manipulate and is costly.

A further object of this invention is to provide apparatus of the general character referred to including an adapter applicable to a well head or the like and supporting a removable gauge carrier operable as a closure, a flow control, preferably in the nature of a stop valve applicable to the base and operable to a position establishing an opening through which the gauge carrier is accessible, and a tool applicable to the flow control and operable therethrough to effect either application or removal of the gauge carrier through the flow control.

The structure in which the invention is embodied may be considered as used on or in connection with a well head and it involves, generally, an adapter, a gauge, a flow control and a tool. The adapter is applicable to the well head and involves a tubular base that can be applied to the head to remain thereon as a fixed part. The base has a flow passage therethrough with an outwardly facing seat and it is provided at its outer end with means for the reception of a gauge carrier and with means for the reception of a flow control. These may be separate threaded portions, for instance, an internal thread for the gauge carrier and an external thread for the flow control. The gauge carrier threaded to the base has a plug portion cooperating with the seat and is moved relative to the head by rotation or threading in the base. At its outer end the gauge carrier has a tool receiving part to facilitate its operation or rotation and it has threads for receiving the nipple of a pressure gauge or other like instrument. When the plug portion of the gauge carrier is seated there is no flow through the base, whereas when it is unseated there is flow or communication or pressure through the base and the carrier to the gauge.

The flow control is preferably in the nature of a plug valve, the body of which is applied directly to the outer end of the adapter base, the plug valve being applicable to the base when the gauge is removed from the gauge carrier. The tool is applicable to the flow control to be opposite or in line with the adapter and preferably involves a housing releasably secured to the flow control or valve, a reciprocating rod carried by the housing, coupling means carried by the rod and engageable with the gauge carrier, a handle to facilitate operation of the rod and pressure equalizing means rendering the tool simple and convenient to operate. The coupling means of the tool is operable to and from the adapter by reciprocation of the rod in the housing and it is such that it can be inserted through the flow control when the flow control is open to make connection with the gauge carrier of the adapter, release it from the base of the adapter and withdraw it sufficiently through the flow control to enable the flow control to be closed, whereupon the tool can be removed with the gauge carrier coupled thereto, thus rendering the gauge carrier accessible for repair or replacement and leaving the flow control exposed for reception of a flow line which, when applied to the flow control can be in communication with the well by opening the control.

This application is a division of application Serial No. 160,222, filed May 5, 1950, entitled "Method and Apparatus for Handling Fluid Under Pressure," wherein the adapter disclosed in this application is specifically claimed.

The various objects and features of my invention will be fully understood from the following detailed description of typical preferred forms and applications of the invention, throughout which description reference is made to the accompanying drawings, in which:

Fig. 1 is a side elevation of a typical well head showing it on a casing with parts broken away to show in section and showing the adapter in place and carrying a pressure gauge. Fig. 2 is a view similar to Fig. 1 showing the well head and a portion of the casing in elevation and a flow control applied to the adapter and coupling a flow line to the well through the adapter. Fig. 3 is an enlarged longitudinal detailed sectional view of the adapter with a gauge thereon, as shown in Fig. 1, and showing the gauge carrier of the adapter in a closed position. Fig. 4 is a view similar to Fig. 3, showing the adapter operated so that the gauge carrier is in an open position so that pressure from the well is communicated to the gauge. Fig. 5 is a detailed transverse sectional view taken as indicated by line 5—5 on Fig. 4. Fig. 6 is a transverse sectional view of a head showing an adapter applied thereto, which adapter is of a form somewhat different from that illustrated in the other figures. Fig. 7 is an enlarged side elevation showing the adapter, the flow control and the tool combined in operating position. Fig. 8 is a longitudinal detailed sectional view of the adapter showing the parts positioned so the coupling means of the tool is engageable with the gauge carrier of the adapter. Fig. 9 is a view similar to Fig. 7 with certain parts shown in section and showing the coupling means of the tool engaged with the gauge carrier of the adapter. Fig. 10 is an enlarged detailed sectional view illustrating the engagement of the coupling means with the gauge carrier. Fig. 11 is a transverse sectional view taken as indicated by line 11—11 on Fig. 10, and Fig. 12 is a side elevation of a portion of the coupling means showing a gauge carrier held thereby.

The apparatus of this invention is useful, generally, where fluid under pressure is being handled and are particularly useful in situations where operations such as flow and gauging are to be selectively performed. Further, the apparatus can be varied widely in size or capacity and to accommodate pressures or pressure variations through a very wide range.

It happens that an oil well where a casing is normally under pressure and is provided with a head presents a typical application of or situation in which the invention can be used to advantage and therefore I will, in this disclosure, make reference to this particular adaptation of the invention, it being understood that the broad aspects of the invention are to be in no way considered or construed as limited thereby.

In the drawings and for purpose of example a well casing 10 is shown equipped with a head 11 and in accordance with standard head construction a part thereof has a lateral opening 13 to which structure provided by this invention is applicable. In practice a head of compound or multiple construction can be employed and various parts of a single head may have openings 13 to which apparatus of the present invention is applied.

The present invention in a form suitable for the use referred to involves, generally, an adapter A normally serving to carry a gauge B, a flow control C releasably attached to or carried by the adapter when the gauge B is removed therefrom, and a tool D applicable to the control C to be carried thereby and when supported by the control operable to apply or remove an element of the adapter. A flow line L is applicable to the control C when the tool is removed from the control.

The adapter includes, generally, an elongate tubular base 15, a gauge carrier 16 and spaced sealing means 17 and 18 acting or sealing between the base and carrier.

The base 15 of the adapter is provided at its inner end with means 19 for making connection with a pressure handling or carrying element such as a well head, or the like. In the case illustrated where there is a well head with a lateral opening 13 the means 19 preferably involves an external thread on the inner end of the base 15, so that the base has threaded engagement with the head, as shown throughout the drawings. The base of the adapter is provided at its outer end portion with means for making connection with the flow control C and for making connection with the gauge carrier of the adapter. In the case illustrated these are separate means, the means for carrying the control C being an external thread 20 on the outer end portion of the base and the means for carrying the carrier 16 being an internal thread 21 in the outer end portion of the opening that occurs through the base from one end to the other. The opening provided through the base 15 has an inner end portion 22 substantially smaller in diameter than the outer end portion 23 and a shoulder or seat 24 occurs between the portions 22 and 23. The particular seat shoulder illustrated in the drawings is inclined or tapered, as clearly appears in Fig. 4 of the drawings.

The gauge carrier 16 of the adapter is an elongate part or element with a central portion 25 externally threaded and engaged with the thread 21 in the base, an outer end portion or head 26 outward of the portion 25 and projecting beyond the outer end of the base, and an inner end portion or plug 27 slidably in the portion 23 of the base opening and having a tapered end 28 movable into and out of engagement with the seat 24 of the base. An annular recess 29 occurs on the plug portion of the gauge carrier between the tapered part 28 and the stem portion 30 which slides in the opening 23.

The seals or sealing means 17 and 18 are axially spaced and they are preferably annular seals or packing devices carried by the gauge carrier, one on the tapered portion 28 thereof and the other on the stem portion 30 thereof, so that they occur at opposite sides of the annular recess 29. The seal 18 serves to maintain sealing engagement between the stem portion 30 and the wall of opening 23 at all times when the gauge carrier is in operating position in the base, whereas the sealing means 17 on the tapered portion of the carrier is movable into and out of sealing engagement with the seat 24.

The gauge carrier is provided with means for holding or carrying the gauge B and in the case illustrated where the carrier has a projecting head portion 26 it is preferred to provide the head portion with an internal thread 35 to receive the projecting threaded nipple 36 of the gauge. A central longitudinal flow passage 37 is provided in the gauge carrier and extends from the head end to a point near the inner end portion of the carrier. Lateral ports 38 connect the passage 37 with the recess 29 so that when the gauge carrier is operated to a retracted or open position such as is shown in Fig. 4, the sealing means 17 is removed from the seat 24 and fluid pressure is communicated from the portion 22 of the base opening through the recess 29, ports 38 and passage 37 to act on the gauge B.

The gauge or instrument B which may vary as circumstances require is shown as involving a case 39 with a face or dial bearing graduations 40 while a hand or indicator 41 cooperates with the graduations. The particular gauge illustrated being of typical construction has a threaded nipple or mounting element projecting from a polygonal collar 43 and it is through the nipple that the gauge is mounted on the outer end of the gauge carrier so the gauge receives pressure from the carrier.

The head portion of the gauge carrier 16 is preferably shaped or fitted to receive a suitable tool so that the carrier can be conveniently rotated as between positions such as are shown in Figs. 3 and 4, or in the course of its being applied to or removed from the base. In the particular case illustrated the exterior of the head 26 is polygonal in cross sectional configuration so it has tool receiving faces 44. In carrying out the present invention the gauge carrier is designed and maintained as small as possible, particularly as to diameter, and in the preferred form, as shown in the drawings, the head portion 26 is of limited size so that it is within the confines of the threaded portion.

The flow control means C employed in carrying out the present invention may vary widely in form and construction. However, it is preferred that it be in the nature of a plug valve. The particular control shown in the drawings is a plug valve having a body 45 with openings 46 and 47 in diametrically opposite sides and a central plug opening 48 which is in communication with openings 47 and 48 and which carries a rotatable plug 49 provided with a diametrically disposed opening 50. In accordance with conventional plug valve construction the plug 49 is operable or rotatable as through engagement with the head 51 on the exposed end of the plug so that the opening 50 of the plug is movable into and out of register with the diametrically opposite openings 46 and 47.

The flow control C is applied to or mounted on the adapter as through the mounting means above described. Where the mounting means for the control C involves an external thread 20 on the outer end of the base of the adapter the valve may be mounted on the adapter by threading the valve onto the threaded portion 20 of the base so that portion 20 enters the opening 46, as shown in Fig. 9 of the drawings. It is to be understood that when the flow control is thus applied to the base of the adapter the gauge B is removed or detached from the gauge carrier and in most instances the gauge carrier will have been operated to a closed position before the gauge is removed and it will be left in that position as the flow control is applied. The diametrically disposed opening 50 provided through the plug 49 of the flow control when aligned with the openings 46 and 47 of the control body forms an opening or passage through which the gauge carrier of the adapter can be applied to or removed from the base of the adapter by way of the opening 47 in the valve body.

The tool D provided by the present invention is provided to facilitate operation of or complete removal or replacement of the gauge carrier of the adapter through the flow control C without allowing escape of fluid.

In accordance with the broader principles of the present invention the tool D may vary considerably in form and construction. However, in its preferred form it involves, generally, an elongate housing 60 with coupling means 61 at one end for making connection with the flow control C and with a closure 62 at the other end. A rod 63 is slidably carried by or in the closure 62 of the housing and has an inner end operating within the housing and an outer end projecting outward from or beyond the closure end of the housing. Coupling means 64 is carried by the inner end of the rod 63 and is engageable with the gauge carrier of the adapter and a head 66 is provided on the outer end of the rod. Pressure equalizing means is provided and may include a sleeve 67 carried by the head 66 and extending over the housing 60 while packing means 68 and 69 seal between the sleeve and the housing 60 and the sleeve and an enlargement 70 on the closure of the housing.

The housing 60 is shown as a simple elongate tubular element establishing an elongate chamber 71 of such size and length as to properly accommodate the coupling means 64 and a part coupled thereto such as the gauge carrier of the adapter. The coupling means 61 at the inner end of the housing may be a simple external thread or threaded portion engageable in the opening 47 of the control means C and thus providing a releasable connection between the tool D and the control means C.

The closure 62 provided at the outer end of the housing is shown as a part joined to the housing through a suitable threaded connection 72 and it has a central bore or opening 73 slidably passing the rod 63. A suitable sealing or packing means 74 seals between the closure and the rod as clearly shown in Fig. 8 of the drawings.

The rod 63 is a simple plain round rod of suitable length slidably supported in and sealed with the closure of the housing. The head 66 is a cup-like element fixed or secured on the outer end of rod 63 as by suitable fastening means 77 and it may have handle portions 78 to facilitate operation or manipulation of the rod as circumstances require.

The sleeve 77 is a tubular or cylindrical element joined to the head 66 as by a threaded connection 80 and it slidably engages over the enlargement 70 provided on the closure 62. The sealing means 68 provided at the end of the sleeve 67 remote from the head establishes sealing engagement between the sleeve and housing while the sealing means 69 maintains sealing engagement between the enlargement 70 and the sleeve. It is to be observed that the interior of the sleeve 67 is somewhat larger in diameter than the exterior of the housing so that a chamber 81 occurs between these elements. The chamber 81 is maintained in communication with the interior of the housing 60 through suitable ports 82 provided in the closure 62. It will be observed from Fig. 8 of the drawings that fluid pressure occurring within the housing 60 or in chamber 70 tends to eject the rod 63 or move it outwardly from the housing through the closure, whereas such pressure communicated through the ports 82 and acting in chamber 81 acts on or through the sleeve 67 tending to move the sleeve, head and rod inwardly or in the opposite direction. By properly proportioning the structure or the elements just described the forces acting in opposite directions can be balanced so that no matter what pressure is communicated to the tool from the well and through the adapter and flow control the tool can be conveniently operated, for example, the head can be easily moved in and out to reciprocate the rod or it can be rotated to cause turning of the rod.

The coupling means 64 serves, generally, as a releasable connection or coupling between the rod 73 and the gauge carrier 16 of the adapter. In the preferred form of the invention the coupling means 64 is adjustable on or longitudinally of the rod 63 so that its working end which engages the gauge carrier can be varied as to position as circumstances may require. In the particular case illustrated the adjustable mounting of the means 64 on the rod 63 involves a sleeve 90 engageable over or slidable on the rod and a set screw 91 is threaded in a lateral opening in the rod 73 and has a head selectively engageable in openings 92 provided in the sleeve 90 to register with the opening in the rod.

The mounting means 64 has a body portion 93 projecting forward from the sleeve 90 so it is beyond the end of the rod and the body portion 93 carries a drive element 94 engageable with the head 26 of the gauge carrier, a pilot member 95 engageable in the gauge carrier, and a releasable retainer 96 engageable with the gauge carrier.

The guide element 91 is preferably a suitably shaped or pointed guide or centering pin on the end of the body 93 and it is shaped and proportioned to slidably enter the threaded outer end portion of the gauge carrier 16 in a manner such as is shown in Fig. 10 of the drawings. The retaining means 96 is preferably carried by the centering pin 95 and, as shown in th drawings, it may involve a spring pressed detent engageable with the threads in the outer end portion of the gauge carrier. The drive member or element 94 is preferably a thin-walled sleeve-like projection extending beyond the end of the body 93 and around the guide pin 95 and having a socket opening 97 corresponding in size and shape to the polygonal exterior of the head 26. With the mounting means 94 formed and constructed as just described it will be apparent hatt it can be engaged with the projecting outer end portion of the gauge carrier in the manner shown in Fig. 10, so that rotation of the rod 65 in the right direction will result in unthreading of the gauge carrier from the base 15, and when this has been accomplished the center pin 95 coacting with the retaining means 96 maintains the detached gauge carrier coupled with the rod 63 so that withdrawal or outward movement of the rod 63, as indicated by the arrow in Fig. 8, results in withdrawal of the gauge carrier through the control means C.

With the form of adapter shown in Figs. 1 to 4 of the drawings the various elements hereinabove described are maintained in axial alignment or on a single axis which is the axis of the opening 13 in the head. When space is limited or under certain conditions it may be desirable that the structure be such that the parts are at different or various angles relative to the head opening 13 when they are in operation or being operated. To gain such angular relationship the base of the adapter may be angularly shaped, as indicated in Fig. 6 of the drawings, and with an adapter base 15$^a$ such as is shown in Fig. 6, it will be apparent that by setting such an adapter in various rotative positions or by varying the angle of such an adapter a very wide range of positions can be gained.

It is believed that the method of the present invention and the manner of operating the various parts will be fully understood from the foregoing description. In a typical situation under normal conditions the adapter will be in place on the head 11 and will be maintained in a closed position, that is, the gauge carrier will be in or seated, as shown in Fig. 3. The gauge B may be maintained on the gauge carrier ready for operation whenever desired, or it can be applied when desired there to determine the pressure of fluid in the head, and assuming the gauge to be in place on the gauge carrier, as shown in Figs. 1, 2 and 3, a suitable tool is applied to the head 26 of the gauge carrier and the gauge carrier is operated relative to the gauge from the position shown in Fig. 3, to a position such as is shown in Fig. 4. With a reading obtained under such conditions the gauge carrier can be returned to the closed position shown in Fig. 3.

When it is desired to either repair or replace the gauge carrier or if it is desired to obtain flow from the well through the opening 13 or to apply pressure to the well through the opening 13, the gauge B having been removed, the flow control C is applied to the base 15 of the adapter, during which operation the gauge carrier is of course left in the closed or seated position, as shown in Fig. 3.

With the flow control C in place and with its plug positioned so that the opening 50 is in line with the openings 46 and 47, the tool D is applied to the flow control by applying the mounting means 61 to the opening 47. The tool D is then operated to advance the coupling means 64 through the plug of the control means or until the elements 94, 95 and 96 of the control means are engaged with the gauge carrier, as shown in Fig. 10. In some situations the parts may be proportioned so that it is necessary to have the plug positioned with the opening 50 in line with the openings 46 and 47 in order to properly establish the flow control on the adapter. Such a situation is illustrated throughout the drawings.

With the coupling means 64 engaged or coupled to the gauge carrier suitable rotation of the rod 64 detaches or separates the gauge carrier from the base, following which suitable withdrawal or longitudinal movement of the rod moves the gauge carrier outwardly through the control means C and to a position where the plug of the control means can be operated to a closed position. Upon closing of the plug or of the control means C the tool D can be detached from the control means C and when it has been detached the gauge carrier held by the coupling means 64, as shown in Figs. 10 and 12, can be readily removed, if desired.

With the gauge carrier removed and the control means C closed the same or a different or a repaired gauge carrier can be applied to the tool, while it is separated from the control D, and then the operation just described can be performed in reverse order until the gauge carrier is in place in the base and in a closed position, following which the coupling means C can be released from the gauge carrier and withdrawn from the control means, whereupon the control means or the tool, or both, can be removed as desired. With the gauge carrier of the adapter removed and the control means C closed a line L can be applied to opening 47 of the control means and through such line and upon opening of the control means pressure can be taken from the well or it can be applied to the well, as circumstances may require.

Having described only typical preferred forms and applications of my invention, I do not wish to be limited to the specific details herein set forth, but wish to reserve to myself any variations or modifications that may appear to those skilled in the art and fall within the scope of the following claims.

Having described my invention, I claim:

1. A tool for operating and handling an instrument carrier relative to a base releasably carrying the carrier and having a flow controlling valve thereon including, a housing applicable to the valve establishing a chamber in communication with the valve, a rod slidably carried by the housing to rotate and reciprocate relative thereto, fluid pressure operated equalizing means between the rod and housing, and coupling means on the rod operable through the valve and into coupled engagement with the carrier to rotate it and to move it longitudinally through the valve when released from the base.

2. A tool for operating and handling an element that is rotatably and releasably coupled to a base having a flow controlling valve thereon including, a housing adapted to be releasably connected to the valve to establish a chamber in communication with the valve, a rod slidably carried by and in sealed engagement with the housing to rotate and reciprocate relative thereto, coupling means on the rod operable through the valve and into coupled engagement with said element to rotate it and to move it longitudinally through the valve when released from the base, the rod having an end portion projecting from the housing, and a fluid pressure operated equalizing means acting between the rod and housing and including the exterior of the housing leaving an annular space therebetween and having a closed end attached to the projecting end portion of the rod, the rod and the space between the housing and sleeve being of like cross sectional area.

3. A tool for operating and handling an element that is rotatably and releasably coupled to a base having a flow controlling valve thereon including, a housing adapted to be releasably connected to the valve to establish a chamber in communication with the valve, a rod slidably carried by the housing to rotate and reciprocate relative thereto, sealing means sealing between the housing and rod, coupling means on the rod operable through the valve and into coupled engagement with said element to rotate it and to move it longitudinally through the valve when released from the base, the rod having an end portion projecting from the housing, fluid pressure operated equalizing means acting between the rod and housing and including a sleeve in sliding engagement with the exterior of the housing leaving an annular space therebetween and having a closed end attached to the projecting end portion of the rod, and sealing means at the other end of the sleeve sealing with the exterior of the housing, the rod and the space between the housing and sleeve being of like cross sectional area.

4. A tool for operating and handling an element that is rotatably and releasably coupled to a base having a flow controlling valve thereon including, a housing adapted to be releasably connected to the valve to establish a chamber in communication with the valve, a rod slidably carried by the housing to rotate and reciprocate relative thereto, coupling means on the rod operable through the valve and into coupled engagement with said element to rotate it and to move it longitudinally through the valve when released from the base, the rod having an end portion projecting from the housing, and fluid pressure operated equalizing means acting between the rod and housing and including, a sleeve in sliding engagement with the exterior of the housing and having a closed end attached to the projecting end portion of the rod, sealing means at the end of the housing remote from the valve and sealing with the sleeve, and sealing means at the other end of the sleeve and sealing with the exterior of the housing.

References Cited in the file of this patent

UNITED STATES PATENTS

| Number | Name | Date |
|---|---|---|
| 961,375 | Seabrook | June 14, 1910 |
| 1,379,139 | Teste | May 24, 1921 |
| 1,678,147 | King | July 24, 1928 |
| 1,701,691 | Mueller et al. | Feb. 12, 1929 |
| 1,944,840 | Humason | Jan. 23, 1934 |
| 2,077,507 | Yancey | Apr. 20, 1937 |
| 2,108,068 | Larry | Feb. 15, 1938 |
| 2,113,598 | Mueller | Apr. 12, 1938 |
| 2,141,274 | Lenhart | Dec. 27, 1938 |
| 2,176,260 | Johnson | Oct. 17, 1939 |
| 2,187,838 | Penick et al. | Jan. 23, 1940 |
| 2,250,244 | Yancey | July 22, 1941 |
| 2,299,365 | Valuch | Oct. 20, 1942 |